(12) United States Patent
Martinez

(10) Patent No.: US 6,536,491 B2
(45) Date of Patent: Mar. 25, 2003

(54) METHOD AND APPARATUS FOR SECURING TIRE CHAINS

(76) Inventor: Joe Martinez, 7319 Concord Ave., Dallas, TX (US) 75235-3722

( * ) Notice: Subject to any disclaimer, the term of this patent is extended or adjusted under 35 U.S.C. 154(b) by 0 days.

(21) Appl. No.: 09/795,175

(22) Filed: Feb. 26, 2001

(65) Prior Publication Data

US 2002/0117245 A1 Aug. 29, 2002

(51) Int. Cl.[7] .............................................. B60C 27/12
(52) U.S. Cl. .................................. 152/218; 152/213 R
(58) Field of Search ................................ 152/220, 219, 152/217, 213 R, 241, 225, 213 A, 218

(56) References Cited

U.S. PATENT DOCUMENTS

| | | | | |
|---|---|---|---|---|
| 3,893,501 A | * | 7/1975 | Brummer et al. | 152/213 R |
| 3,895,664 A | * | 7/1975 | Muller | 152/219 |
| 4,237,951 A | * | 12/1980 | Dirks | 152/241 |
| 4,799,522 A | * | 1/1989 | Ilon | 152/213 R |
| 4,862,936 A | * | 9/1989 | McDonough | 152/216 |
| 4,922,982 A | * | 5/1990 | Metraux | 152/216 |
| 5,284,196 A | * | 2/1994 | Nielsen | 152/208 |
| 5,316,191 A | | 5/1994 | Gibson et al. | 224/42.45 |
| 5,785,783 A | | 7/1998 | Thioliere | |
| 6,047,754 A | | 4/2000 | Drum | 152/213 |
| 6,085,816 A | | 7/2000 | Clark et al. | 152/220 |

FOREIGN PATENT DOCUMENTS

JP          02164607 A   *  6/1990

* cited by examiner

Primary Examiner—S. Joseph Morano
Assistant Examiner—Frantz F. Jules
(74) Attorney, Agent, or Firm—Bickel & Brewer; Daniel F. Perez

(57) ABSTRACT

A method and apparatus for securing snow tire chains to tires. Two cables are secured to snow tire chains secured about at least one tire utilizing a securing mechanism. The two cables are secured to the securing mechanism utilizing a connecting mechanism integrated with the securing mechanism. The cables are connected to the snow tire chains by a tensioning mechanism integrated with the securing mechanism. The securing mechanism is centrally mounted along a side of the tire. The securing mechanism can be configured with a chamber for receiving the cables within the securing mechanism. The tension mechanism is generally centrally located within the securing mechanism. The cables can be attached to the snow tire chains utilizing an attachment mechanism.

10 Claims, 8 Drawing Sheets

METHOD AND APPARATUS FOR SECURING TIRE CHAINS

FIELD OF THE INVENTION

The present invention is generally related to automotive and truck accessories. The present invention is also related to snow chains for tires. The present invention additionally relates to techniques for mounting snow chains on tires. In addition, the present invention is related to devices for securing snow chains on tires.

BACKGROUND

In many parts of the country and the world, winter driving requires the use of snow chains on tires in order to provide traction on icy and snow-packed roads. When a road is covered with snow, vehicle tires run an increased risk of skidding or losing traction. This is particularly true for large tractor-trailor trucks which are required by law in many jurisdictions to utilize snow chains during hazardous winter driving conditions. Such snow chains are often difficult to secure to truck tires, particularly in cold and icy conditions. Once the snow chains are secured to truck tires, it would be desirable to maintain the snow chains securely about the tires without having to constantly reattach or readjust (e.g., tighten) the chains on the snow tires when they become loose.

FIG. 1 is a perspective view of a set of double-wide snow chains 10 which are typically utilized as traction devices on large trucks. The chains, or "3-Railer", are usually ¼-inch or ⅜-inch in diameter, and have three longitudinal runners 11–13 and a plurality of cross chains 14. The extensions 15 of the runners extend beyond the cross chains at one end to function as adjusting links.

The other end of the runners has three half-links 16 which are utilized as hooks, and, when installed on the tires, are hooked into one of the adjusting links in the extended runners 15. The two outside runners each have a chain cam 17 which may be utilized to tighten the chains as required for driving. A set of these chains are typically about eight feet long and are spaced approximately ten inches apart. The cross chains 14 are approximately 10 inches apart through the length of the chains.

FIG. 2 is a perspective view of a set of double truck wheels 21 and tires 22 mounted on a single axle 23. Wheel holes 24 enable a visual inspection of brake components (not shown), and provide access to valve stems for the tires 22. The wheels are manufactured with a wheel rim 25 where the tires are mounted. Snow chains are manufactured so that a single set of double-wide chains 10, covers both tires.

A set of double-wide snow chains weighs approximately 75 pounds. Therefore, without any assistance, these snow chains are extremely difficult for one person to install on the truck tires. To install the snow chains (i.e., "chain up"), the chains are draped over the dual truck tires to the ground. The truck may then be backed up or moved forward to roll over the chains so they can be fastened together with the hooks 16 and adjusting links 15. Slack in the snow chains, however, tends to follow the wheel as it turns. Therefore the hooks 16 and adjusting links 15 often do not reach each other after driving over the chains because the slack may be held under the tire.

Alternatively, the driver may lay the chains out on the ground behind the tires, and then attempt to drive onto the chains. The two ends of the chain set must then be lifted and hooked together without any slack in the chains. This is difficult to accomplish, however, without creating undesirable slack in the chains, especially in the icy or snowy conditions which are typical.

Once the chains are wrapped about the tires and the truck begins to move, the chains usually become loose as the truck moves forward through icy or snowy conditions. Techniques have been developed that attempt to secure the chains to the tires using elastic-type chords or cables.: Due to the elastic nature of such chords, however, the chains easily become loose and the driver is often forced to stop the truck and re-secure the chains to the tires. Constantly stopping every few miles during icy and snowy conditions to resecure these elastic-type chords presents a hazard to the driver and to other motorists on the road, not to mention the inconvenience the driver faces from the loss of time. Most jurisdictions in the United States require trucks to use snow tires during icy or snowy conditions. The constant stopping and retightening of such elastic type cables, however, will slow the truck driver down and prevent the truck from making progress toward its next destination during icy or snowy conditions.

In order to overcome the disadvantages of existing methods of installing, maintaining and using current snow chains on tires, it would be advantageous to have improved methods and apparatuses that permits truck drivers to efficiently secure snow tire chains to tires without the necessity of constantly having to resecure the chains to the tires, particularly during ice and snowy conditions. In addition, it would be advantageous to implement a device which may be easily utilized by one person to securely anchor snow chains to a tire so that the chains can be wrapped around the tire with little resulting slack. The present invention provides such a device.

SUMMARY

It is one aspect of the present invention to provide improved automotive and truck accessories.

It is another aspect of the present invention to provide improved methods for mounting snow chains on tires.

It is yet another aspect of the present invention to provide a method and apparatus for efficiently securing snow chains on tires.

It is still another aspect of the present invention to provide a securing mechanism for securing cables to snow tire chains mounted on tires.

It is yet another aspect of the present invention to provide a tensioning mechanism for tightening or loosening cables within the securing mechanism.

The above and other aspects of the present invention are achieved as is now described. A method and apparatus for securing snow tire chains to tires. Two cables may be secured to snow tire chains secured about at least one tire utilizing a securing mechanism. It is expected, however, that the present invention will be more appropriately utilized with double wide truck tires. The two cables can be secured to the securing mechanism by a connecting mechanism integrated with the securing mechanism. The cables may be connected to the snow tire chains by connectors or hooks attached to particular chain links of the snow tire chains. Additionally, a locking mechanism can be integrated with the securing mechanism to tighten and lock the cables in place at a desired tension. The securing mechanism may be centrally mounted along a side of the tire or tires. The securing mechanism can be configured with a chamber for receiving the cables within the securing mechanism. The tension mechanism may generally be located centrally within the securing mechanism. The cables can be attached to the snow tire chains utilizing an attachment mechanism.

DESCRIPTION OF PREFERRED EMBODIMENTS

Figure 1:
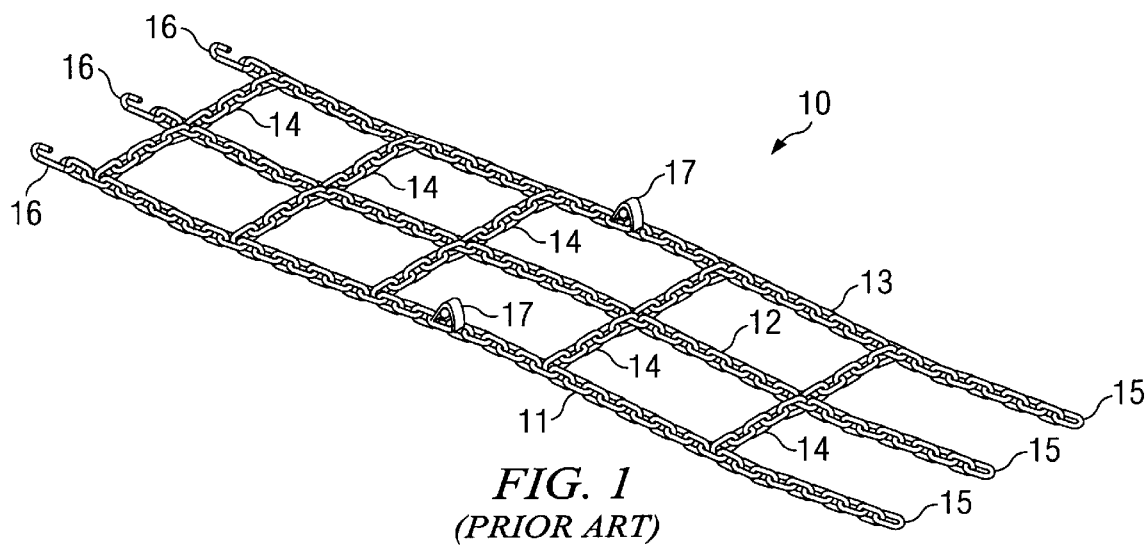
FIG. 1 (Prior Art) illustrates a perspective view of a set of double-wide snow chains typically utilized as traction devices on large trucks.
Figure 2:
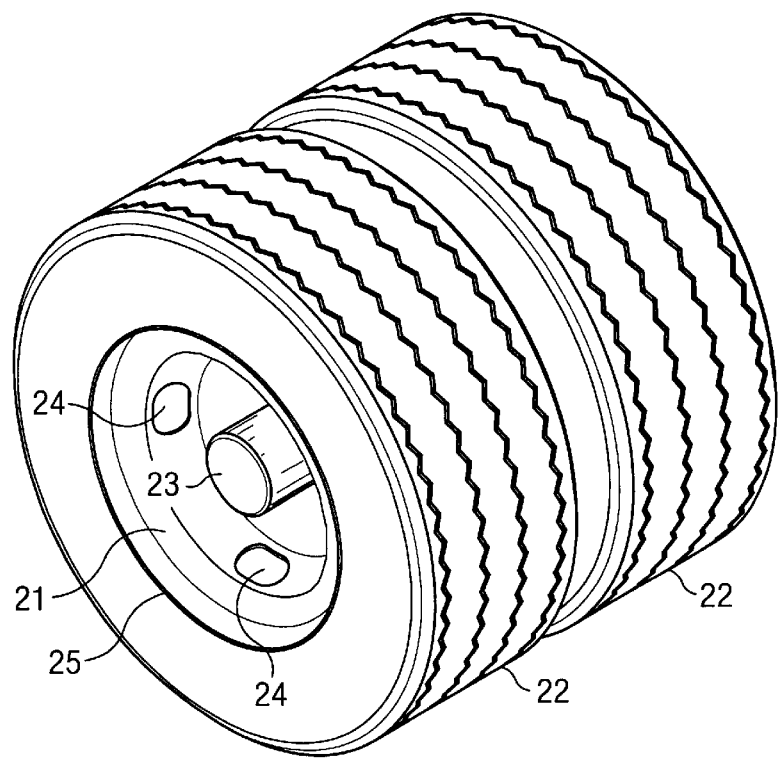
FIG. 2 (Prior Art) depicts a perspective view of a set of double truck wheels and tires mounted on a single axle that can be utilized in accordance with a preferred embodiment of the present invention.
Figure 3:
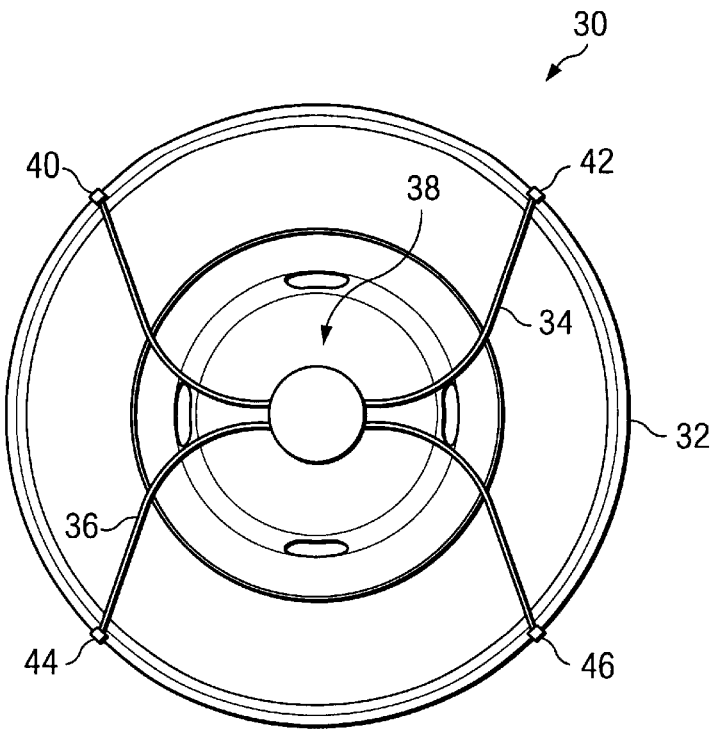
FIG. 3 illustrates a side view of a snow chain securing apparatus mounted on a set of double-wide tires prior to the tensioning of securing cables, in accordance with a preferred embodiment of the present invention.

FIG. 3 illustrates a side view of a snow chain securing apparatus 30 mounted on a set of double-wide tires 32 prior to the tensioning of securing cables 34 and 36, in accordance with a preferred embodiment of the present invention. The apparatus 30 for securing snow tire chains or other similar anti-skid devices to tires illustrated in FIG. 3 may be composed of a securing mechanism 38 for securing cables 34 and 36 to snow tire chains secured about double-wide tires 32. Apparatus 30 additionally may include a connecting mechanism integrated with the securing mechanism 38 for securing the cables 34 and 36 to the securing mechanism 38. Apparatus 30 may also incorporate a tensioning mechanism integrated with the securing mechanism 38 for tensioning the cables 34 and 36 connected to the snow tire chains. Such a tensioning mechanism may decrease or increase tension associated cables 34 and 36, in response to user activation of 'such a tensioning mechanism.

Although not pictured in FIG. 3, those skilled in the art can appreciate that the cables 34 and 36 are respectively connected to snow tire chains at connectors 40, 42, 44, and 46. Cable 34 may be connected to snow tire chains at connectors 40 and 42, while cable 36 may be connected to the snow tire chains at connectors 44 and 46. The connecting mechanism and tensioning mechanism are not pictured in FIG. 3, but can be housed within securing mechanism 38.

The connecting mechanism and tensioning mechanism are illustrated and described in greater detail herein. Securing mechanism 38 may be mounted centrally along at least one side of the at least one tire and comprises one or more chambers for receiving cables 34 and 36 within the securing mechanism 38.

Figure 4:
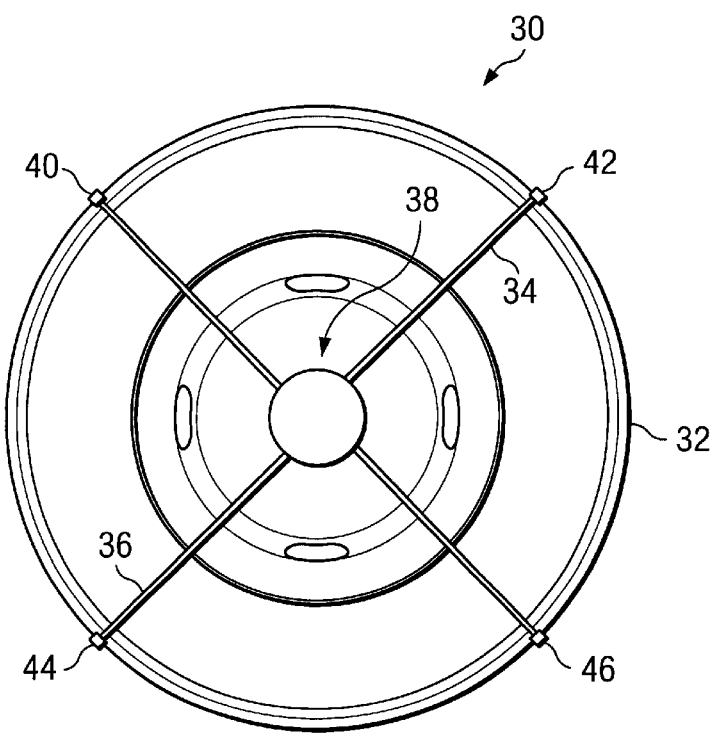
FIG. 4 depicts a side view a snow chain securing apparatus mounted on a set of double-wide tires after tensioning of securing cables, in accordance with a preferred embodiment of the present invention.

FIG. 4 depicts a side view snow chain securing apparatus 38 mounted on a set of double-wide tires after tensioning of securing cables 34 and 36, in accordance with a preferred embodiment of the present invention. In FIG. 3 and FIG. 4, like parts are indicated by like reference numerals. Thus, apparatus 38 in FIG. 3 and FIG. 4 had been tensioned by the tensioning mechanism in order to secure cables wrapped about tires 32. Those skilled in the art can appreciate that although securing apparatus 38 may be mounted on a set of double-wide tires, other types of tires may also be utilized in accordance with the present invention includes various types of truck and car tires. Some tires may be configured as single tires, double-wide tire sets, or even sets of triple tires or more. Thus, double-wide tires, as referred to herein, is described and disclosed for illustrative purposes only.

Figure 5:
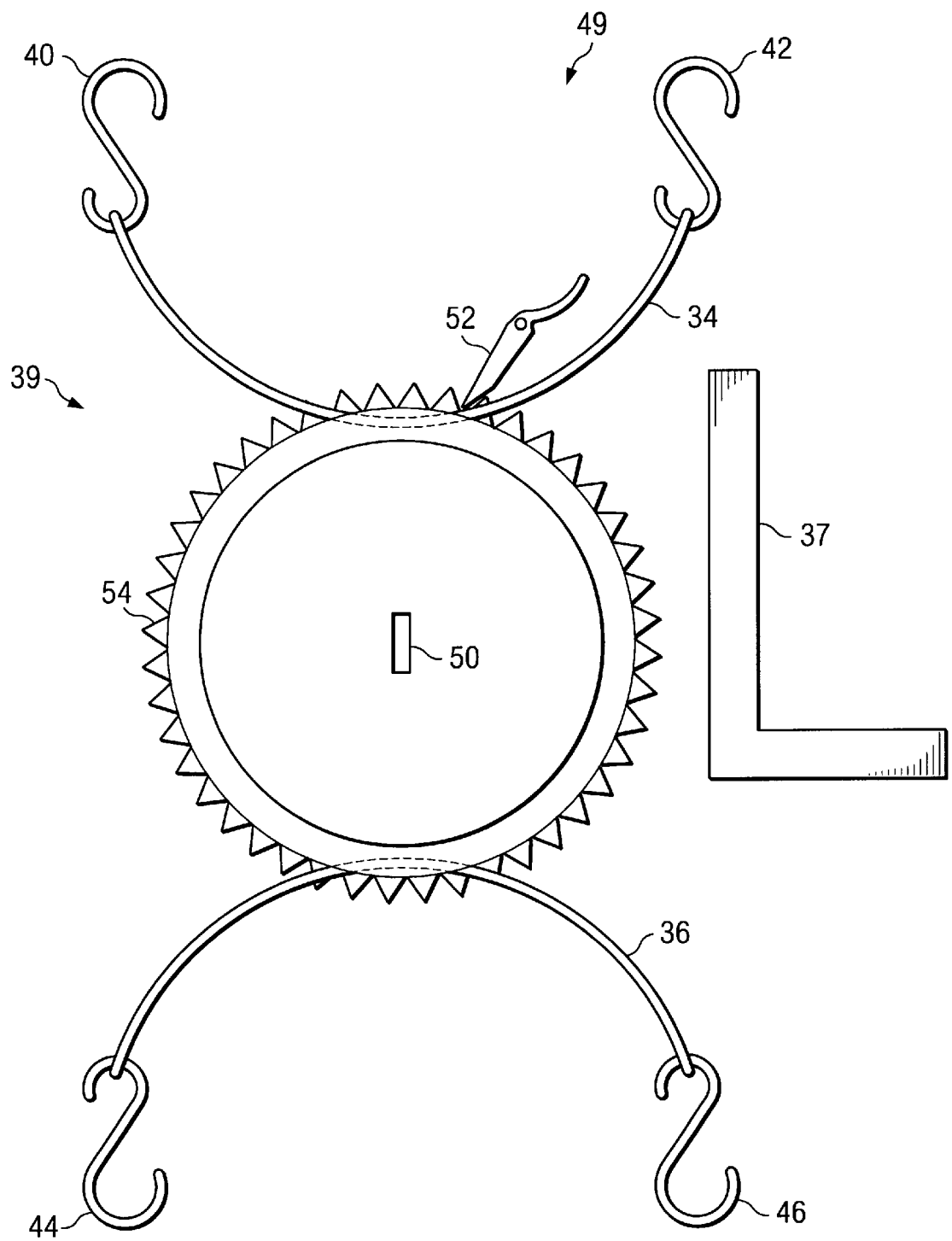
FIG. 5 illustrates a detailed view of a snow chain securing apparatus, in accordance with a preferred embodiment of the present invention.

FIG. 5 illustrates a detailed view 49 of a snow chain securing apparatus, in accordance with a preferred embodiment of the present invention. Note that in FIG. 3 to FIG. 5, like parts are indicated by like reference numerals. Thus, in FIG. 5, cables 34 and 36 are illustrated secured to securing mechanism 39. Securing mechanism 39 of FIG. 5 is analogous to securing mechanism 38 of FIGS. 3 and 4. Securing mechanism 39, however, may be configured with sprockets 54, which permit cable 34 to. be secured to securing mechanism 39 utilizing a locking mechanism 50, which may lock cables 34 and 36.

When a user desires to release cable 34 from securing mechanism 39, the user moves release lever 37 into an open position, thereby permitting cable 34 to be released from the grip of sprockets 54. Sprockets 54 and release lever 37 together may form a tensioning mechanism for tensioning the two cables connected to the snow tire chain. Such a tensioning mechanism may be generally integrated with securing mechanism 39. Sprockets 54 and release lever 37 can both be generally integrated with securing mechanism 39. Sprockets 54 are indicated by the angular lines indicated in FIG. 6 about the circumference of securing mechanism 39. Sprockets 39 thus function as a connecting mechanism integrated with securing mechanism 39. Connectors 40, 42, 44, and 46 are illustrated in FIG. 5 as hooks. Such hooks are respectively connected to appropriate portions of snow tire cables wrapped about at least one tire, such as tire 32 illustrated in FIGS. 3 and 4.

Those skilled in the art can appreciate that although connectors 40 to 46 are illustrated in FIG. 5 as hooks, other types of connectors may be also utilized in accordance with preferred embodiments of the present invention. Such hooks are not intended to be limiting features of the invention. Other types of connectors may be utilized instead. Additionally, although only one release lever 52 is depicted in FIG. 5, it is understood that an additional release lever may be integrated with securing mechanism 39 opposite release lever 52 to secure cable 36 to securing mechanism 39.

Figure 6:
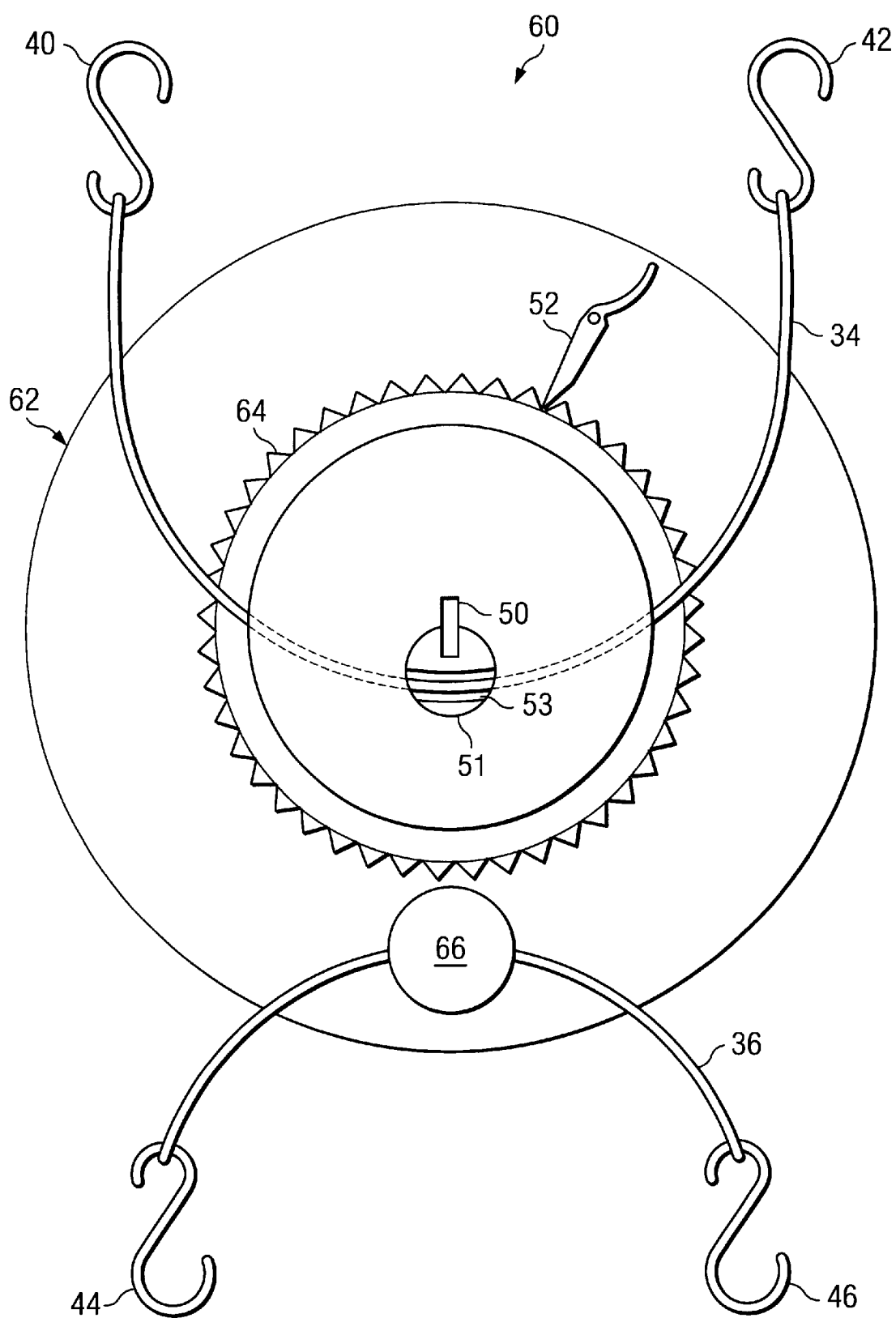
FIG 6 depicts a detailed view of an alternative snow chain securing apparatus, in accordance with a preferred embodiment of the present invention.

FIG. 6 depicts a detailed view 60 of an alternative snow chain securing apparatus 62, in accordance with a preferred embodiment of the present invention. In FIG. 3 to FIG. 6, like parts are indicated by like reference numerals. Thus, in FIG. 6 cable 36 is secured to a set of snow tire chains wrapped about a set of double wide tires by connectors 44 and 46, which are illustrated as hooks. Similarly, cable 34 may be secured to the snow tire chains by hooks 40 and 42. Securing mechanism 62 is analogous to securing mechanism 38 of FIGS. 3 and 4 and securing mechanism 39 of FIG. 5. Securing mechanism 62, however, may be integrated with an attachment mechanism 66, which can serve to secure cable 36 to securing mechanism 62.

Sprockets 64 can permit cable 34 to be connected to securing mechanism 62. Additionally, release lever 52 may act to release cable 34 from sprockets 64. Similar features may be implemented to permit the attachment of cable 36 to attachment mechanism 66 and ultimately, to securing mechanism 62. Again, those skilled in the art can appreciate that such features, as described herein, merely represent possible features that may be utilized in accordance with preferred embodiments of the present invention, including methods and systems thereof.

Additionally, as indicated in FIG. 6, cable 34 may be received through sprockets 52, as depicted by the dashed line in FIG. 6. Those skilled in the art can thus appreciate that sprockets 64 may be configured as a circular plate with indentations which form sprockets. The circular plate may be locked into a desired position by release lever 52. Locking mechanism 50 may also serve to move the circular plate left or right to place the sprockets 64 into a desire position for locking by release lever 52. As the circular plate moves, so too will the cable move, thereby tightening or releasing the cable 34. Cable 34 may be received additionally through a internal chamber 34 having an opening therein 52. Such features are optional and may be provided to ensure that cable 34 is secured by the circular plate of sprockets 34. Note that the present invention may be implemented utilizing a "come along" mechanism, a device well-known in the art to secure cables, pulleys, and other devices. Such a "come along" mechanism may be utilized in association with sprockets 64 and the circular plate to tighten cable 34 to a desired tension. Thus, the configuration described herein represents merely one type of device for implementing the methods and systems described herein.

Other locking devices may also be utilized, so long as the essential elements of the present invention, such as the securing, locking and tensioning mechanisms are utilized to secure tire chains to at least one tire. Attachment mechanism 66 may be implemented as a pin which holds cable 35 in place. One or more pins may be utilized to hold the cables in place. It is anticipated, however, that a "come along" type mechanism or other similar device will be utilized to hold at least one of the cables in place, while a pin may be utilized to hold the other remaining cable into place. The "come along" device, however, will be utilized to tension cable 34 to a desired tension.

Figure 7:
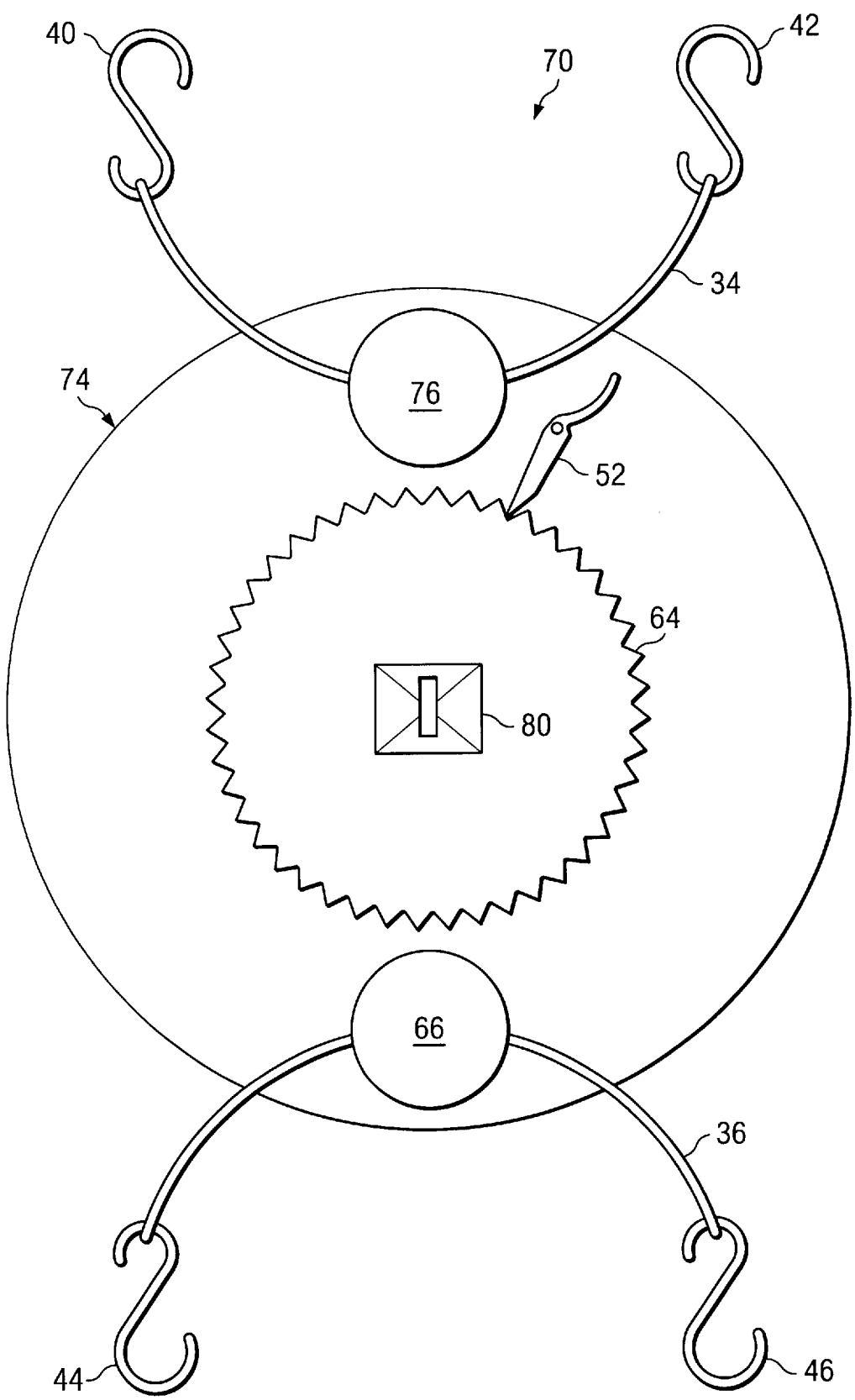
FIG. 7 illustrates a detailed view of an alternative snow chain securing apparatus, in accordance with a preferred embodiment of the present invention.

FIG. 7 illustrates a detailed view of alternative snow chain securing apparatus, in accordance with a preferred embodiment of the present invention. In FIGS. 6 and 7, like parts are indicated by like reference numerals. Thus, in FIG. 7, cable 36 may be secured to snow tire chains by connectors 44 and 46 which are represented as hooks. Likewise, cable 34 may be secured to snow tire chains by connectors 40 and 42 which are also represented as hooks. Attachment mechanisms 66 and 76 are integrated with securing mechanism 74, which includes sprockets 64.

Attachment mechanisms 66 and 76, along with lever 52 or additional levers, form a connecting mechanism for connecting cables 36 and 34 to securing mechanism 74. Locking mechanism 80 may be configured as a lock. When a desired tension is attained, the user activates locking mechanism 80 (i.e. lock) into a particular position until unlocked at a later time. Attachment mechanisms 64 and 66 may be moved toward sprockets 64 in order to maintain appropriate tension via sprockets 64. Release lever 52 may be moved into an open position in order to release attachment mechanisms 64 and 66 from the grip of sprockets 64.

Figure 8:
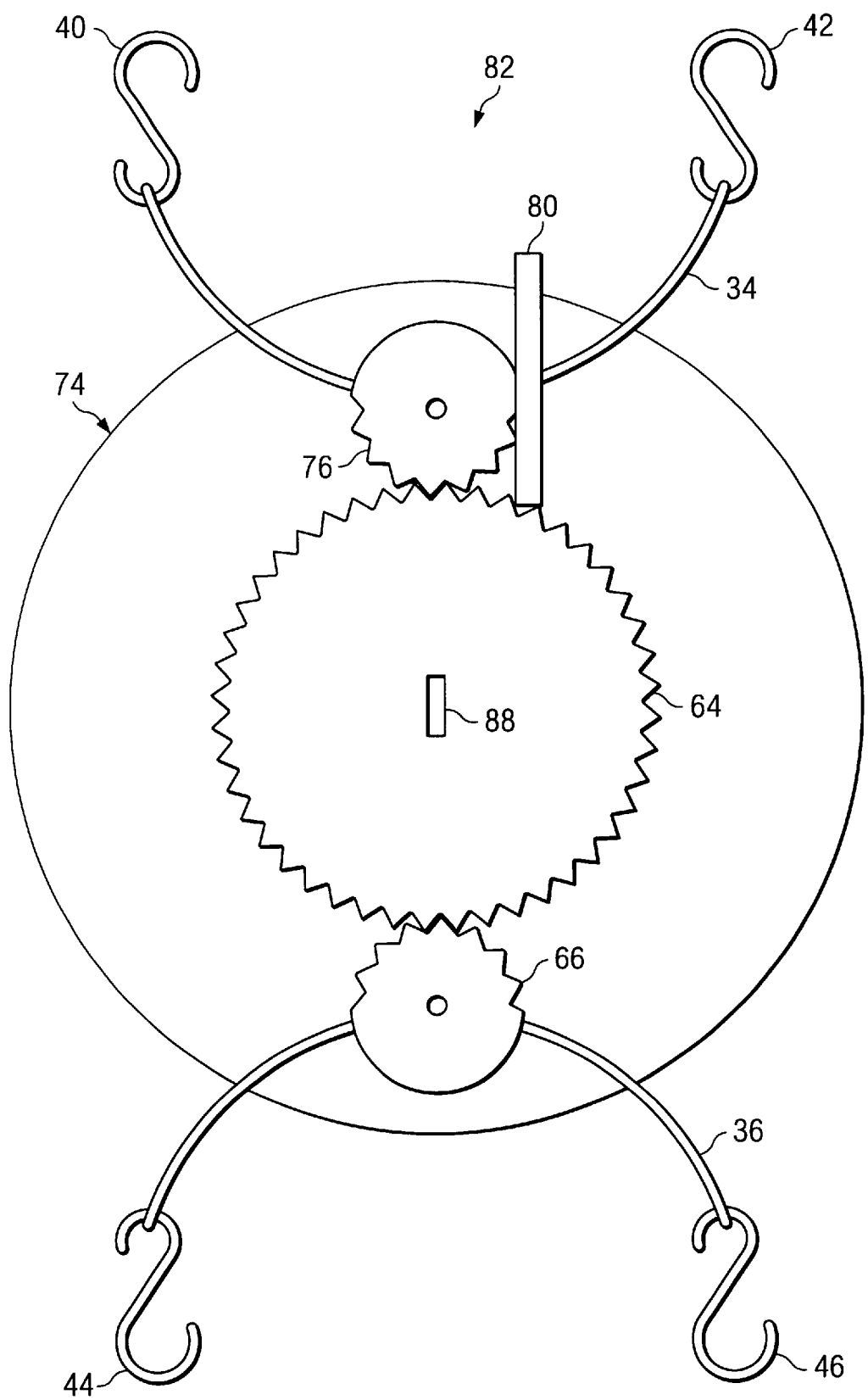
FIG. 8 depicts a detailed view of an alternative snow chain securing apparatus, in accordance with a preferred embodiment of the present invention.

FIG. 8 depicts a detailed view of an alternative snow chain securing apparatus 82, in accordance with a preferred embodiment of the present invention. Again, those skilled in the art will appreciate that in FIG. 3 to FIG. 8, like parts are indicated by like reference numerals. FIG. 8 thus illustrates an alternative preferred embodiment of the present invention. Apparatus 82 includes a securing apparatus 74 which includes a locking mechanism 88. Locking mechanism 88 of FIG. 8 is analogous to locking mechanism 80 of FIG. 7. Attachment mechanisms 66 and 76 are respectively connected to cables 36 and 34. In the illustration of FIG. 8, attachment mechanisms 66 and 76 engage sprockets 64, while in FIG. 7, the attachment mechanisms 66 and 76 do not engage sprockets 64. FIG. 7 and FIG. 8 together thus illustrate a range of movement for attachment mechanisms 66 and 76 toward and away from sprockets 64. Release lever 80 is shown in FIG. 8 in a vertical position to indicate engagement of attachment mechanisms 66 and 76 with sprockets 64, and thus the securing of cables 34 and 36 to securing mechanism 74. Attachment mechanisms 66 and 76 may be implemented as pins for holding cables 36 and 34 in place. Although two attachment mechanisms are illustrated in FIG. 8, those skilled in the art can appreciate that only attachment mechanism may be utilized depending on the implemented configuration.

Figure 9:
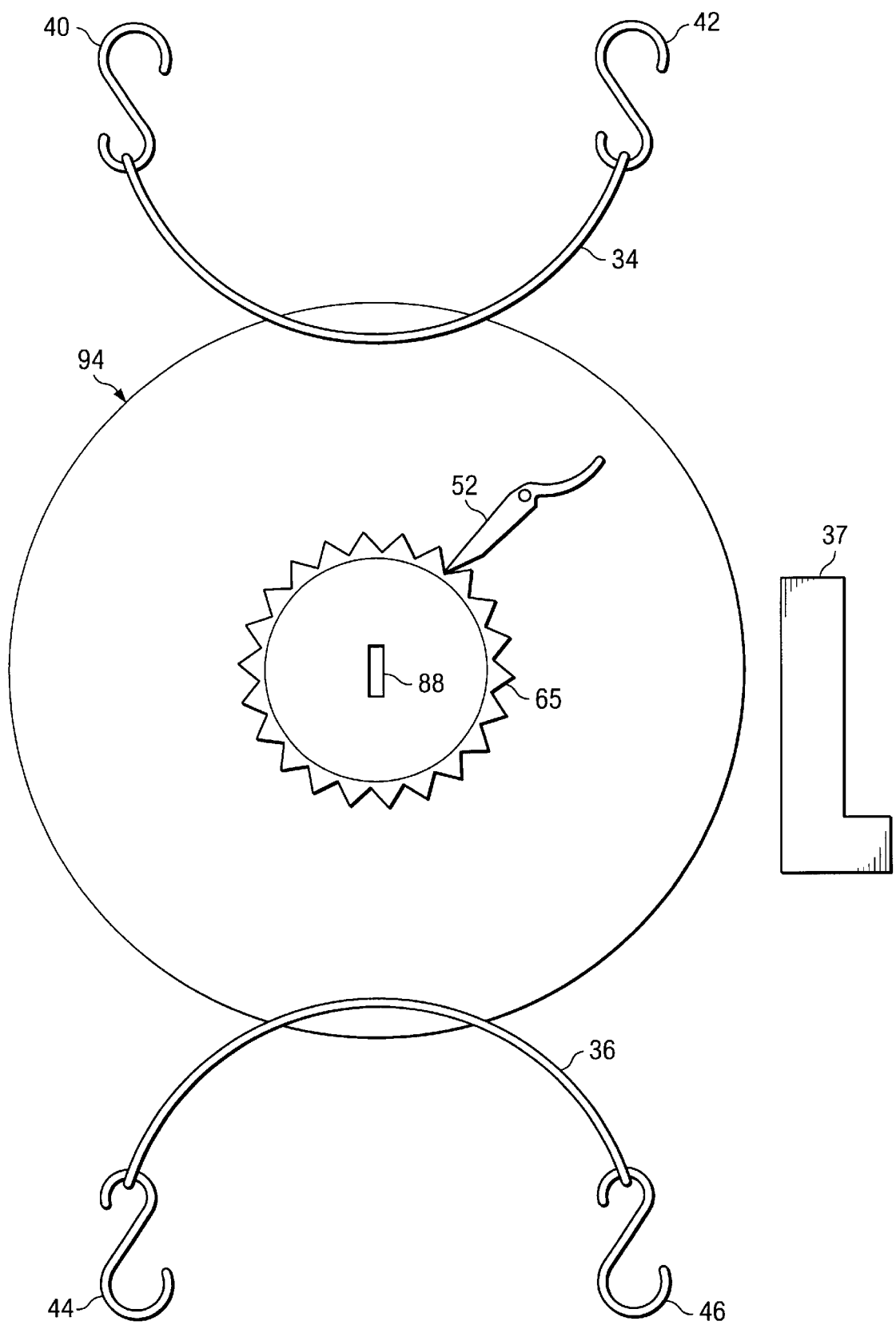
FIG. 9 illustrates a high level view of a securing apparatus in accordance with a preferred embodiment of the present invention.

FIG. 9 illustrates a high level view of a securing apparatus 94 in accordance with a preferred embodiment of the present invention. FIG. 9 depicts an alternative preferred embodiment of the present invention. Again, in FIG. 8 and FIG. 9, like parts are indicated by like reference numerals. Although attachment mechanisms are not illustrated in FIG. 9, it is understood that such attachment mechanisms may be utilized in accordance with various embodiments of the present invention. Locking mechanism 88 is illustrated in FIG. 9 engaged in a locked position. Locking mechanism 52 is also indicated in a closed position locking sprockets 65 into place. Note that sprockets 65 may be composed of a circular gear-like mechanism which is locked into place by release lever 52. Note additionally that in FIG. 9, a portion 37 of a key (i.e., a key portion) is illustrated, which may be utilized in association with the present invention described herein to move sprockets 65 to a desired position. Such a key may be implemented, for example, as an alan wrench, which can be inserted into locking mechanism 88 in order to turn sprockets 65, and hence the circular plate about which sprockets 65 are integrated.

Figure 10:
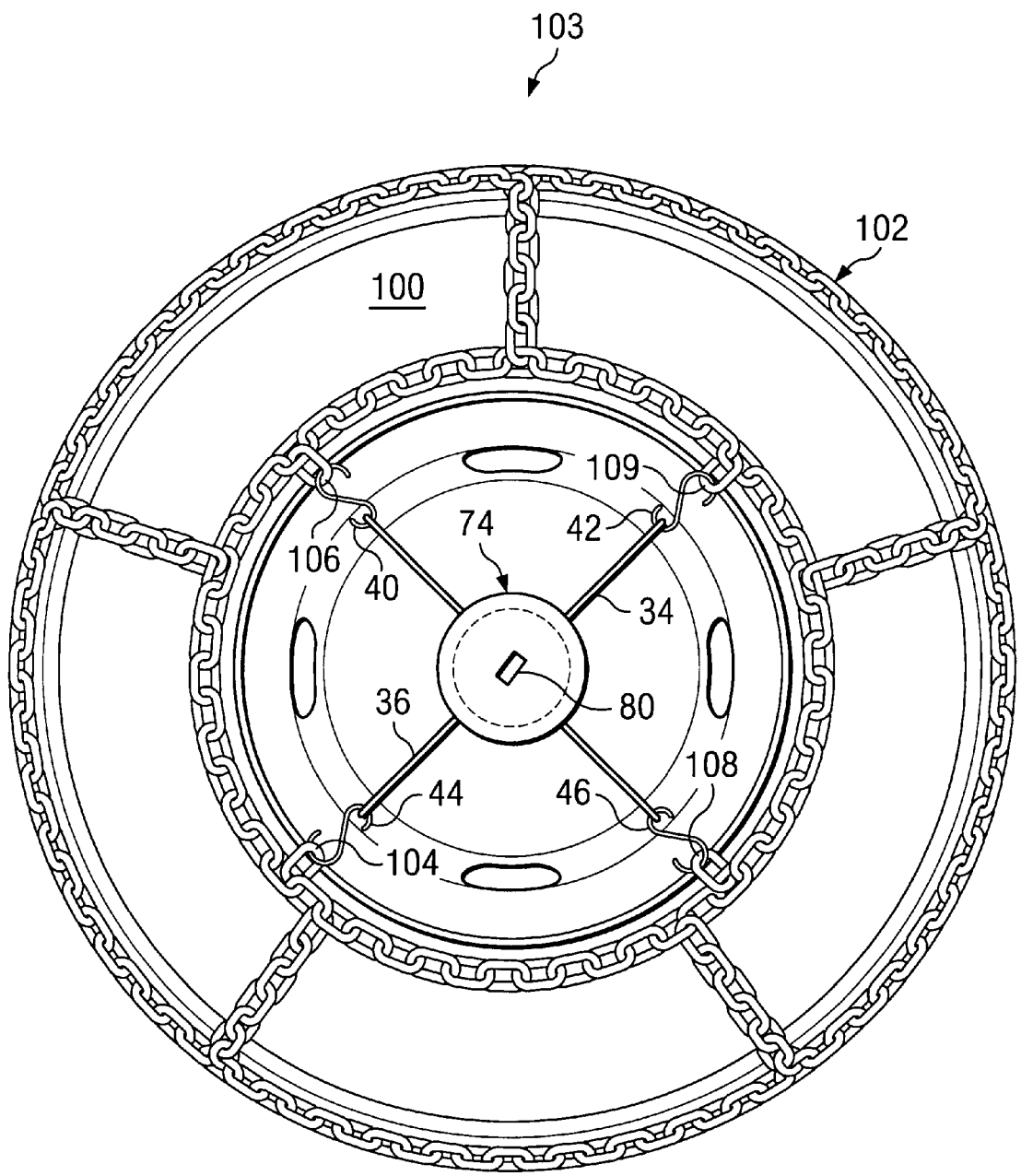
FIG. 10 depicts a side view of a securing apparatus and cables thereof attached to a set of snow tire chains, in accordance with a preferred embodiment of the present invention.

FIG. 10 depicts a side view 103 of a securing apparatus and cables thereof attached to a set of snow tire chains 102, in accordance with a preferred embodiment of the present invention. Snow tire chains 102 are wrapped about a tire 100. Note that in FIGS. 3 to 10, like parts are indicated by like reference numerals. Thus, cable 34 and 36 is secured to securing apparatus 38. Connectors 44, 46, 42, and 40 may be secured to snow tire chain 102 respectively via chain links 104, 108, 109, and 106. When a truck driver desires to use snow tire chains 102 on a set of double wide truck tires and wishes to secure the snow tire chains securely to such truck tires, the driver secures the snow tire chains to the tires via cables 36 and 34 and securing mechanism 74. Locking mechanism 80 may be configured as a lock which functions to secure cables 36 and 34 to securing mechanism 74. When a desired tension is achieved in cables 36 and 34, securing mechanism 74 may be locked into place via a lock integrated with or associated with locking mechanism 74.

Based on the foregoing, those skilled in the art can appreciate that the invention disclosed herein comprises a method and apparatus for securing snow tire chains to tires. According to the method and system described herein, two cables may be secured to snow tire chains secured about at least one tire utilizing a securing mechanism. It is expected, however, that the present invention will be more appropriately utilized with double wide truck tires. The two cables can be secured to the securing mechanism by a connecting mechanism integrated with the securing mechanism. The cables may be connected to the snow tire chains by connectors or hooks attached to particular chain links of the snow tire chains. Additionally, a tensioning mechanism can be integrated with the securing mechanism to tighten the cables to a desired tension. The securing mechanism may be centrally mounted along a side of the tire or tires. The securing mechanism can be configured with a chamber for receiving the cables within the securing mechanism. The tension mechanism may be generally centrally located within the securing mechanism. The cables can be attached to the snow tire chains utilizing an attachment mechanism.

The embodiments and examples set forth herein are presented in order to best explain the present invention and its practical applications and to thereby enable those skilled in the art to make and utilize the invention. Those skilled in the art can recognize that the foregoing description and examples have been presented for the purposes of illustration and example only. Thus, the description as set forth herein is not intended to be exhaustive or to limit the invention to the precise form disclosed. Many modifications and variations are possible in light of the above teaching without departing from the spirit and scope of the following claims.

What is claimed is:

1. A method for securing snow tire chains to tires, said method comprising the steps of:
   securing at least two cables to snow tire chains secured about at least one tire utilizing a securing mechanism;
   securing said at least two cables to said securing mechanism utilizing a connecting mechanism integrated with said securing mechanism;
   tensioning said at least two cables connected to said snow tire chains utilizing a tensioning mechanism integrated with securing mechanism;
   centrally mounting said securing mechanism along at least one side of said at least one tire; and
   configuring said securing mechanism to comprise at least one chamber for receiving said at least two cables within said securing mechanism.

2. The method of claim 1 further comprising the step of:
   centrally locating said tensioning mechanism within said securing mechanism.

3. The method of claim 2 further comprising the step of:
   attaching said at least two cables to said snow tire chains utilizing an attachment mechanism.

4. The method of claim 1 further comprising the step of:
   configuring said connecting mechanism to comprise at least one attachment mechanism for connecting said at least two cables to said securing mechanism.

5. The method of claim 1 further comprising the step of:
   integrating said tensioning mechanism with said connecting mechanism to decrease or increase tension associated with said at least two cables.

6. The method of claim 5 further comprising the step of:
   decreasing or increasing tension associated with said at least two cables, in response to user activation of said tensioning mechanism.

7. The method of claim 6 further comprising the step of:
   configuring said tensioning mechanism to comprise a locking mechanism for securing tension associated with said at least two cables to a desired point of tension.

8. The method of claim 7 further comprising the step of:
   configuring said attachment mechanism to comprise at least two hooks for connecting to said at least two cables.

9. An apparatus for securing snow tire chains to tires, said apparatus comprising:
   securing mechanism for securing at least two cables to said snow tire chains secured about at least one tire, said security mechanism includes at least one chamber for receiving said at least two cables within said securing mechansim, wherein said security mechanism is centrally mounted along at least one side of said tires;
   connecting mechanism integrated with said securing mechanism for securing said at least two cables to said securing mechanism; and
   tensioning mechanism integrated with said securing mechanism for tensioning said at least two cables connected to said snow tire chains.

10. The apparatus of claim 9 wherein said securing mechanism is mounted centrally along at least one side of said at least one tire.

* * * * *